Oct. 11, 1949.  J. L. QUIGLEY ET AL  2,484,464
LENS MOUNT WITH TELESCOPING LENS
TUBES AND LOCKING MEANS
Filed Oct. 2, 1947

JOHN L. QUIGLEY
DOUGLASS C. HARVEY
INVENTORS

BY
ATTORNEYS

Patented Oct. 11, 1949

2,484,464

UNITED STATES PATENT OFFICE 2,484,464

LENS MOUNT WITH TELESCOPING LENS TUBE AND LOCKING MEANS

John L. Quigley and Douglass C. Harvey, Rochester, N. Y., assignors to Eastman Kodak Company, Rochester, N. Y., a corporation of New Jersey Application October 2, 1947, Serial No. 777,514

8 Claims. (Cl. 88—57)

The present invention relates to a lens mount, and more particularly to a lens tube which may be moved from a retracted inoperative position to an extended operative position in the mount.

The invention has as its principal object the provision of an arrangement for locking the movable lens tube, when in either position, to the lens mount.

A still further object of the invention is the provision of means for retaining the tube releasably in locking relation with the mount.

Yet another object of the invention is the provision of a locking means which permits the ready release of the lens tube so that the latter may be positioned for axial movement from one to the other of its positions and again releasably locked.

Still another object of the invention is the provision of means for positioning the lens tube selectively for either axial movement or locking.

Yet another object of the invention is the provision of positioning and locking means which are simple, rugged, inexpensive to manufacture, positive in their operation and highly effective in use.

To these and other ends, the invention resides in certain improvements and combinations of parts, all as will be hereinafter more fully described, the novel features being pointed out in the claims at the end of the specification.

In the drawings.

Similar reference numerals throughout the various views indicate the same parts.

Figure 1:
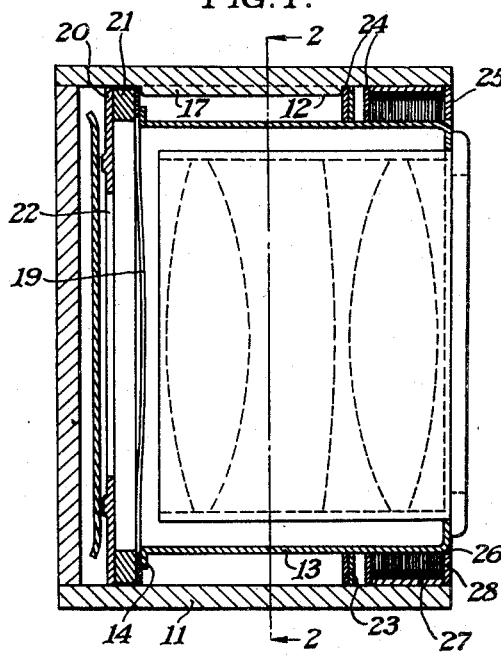
Fig. 1 is a longitudinal sectional view through a lens mount and lens tube constructed in accordance with the present invention, showing the relation of the parts, and with the lens tube in its retracted or inoperative position.
Figure 2:
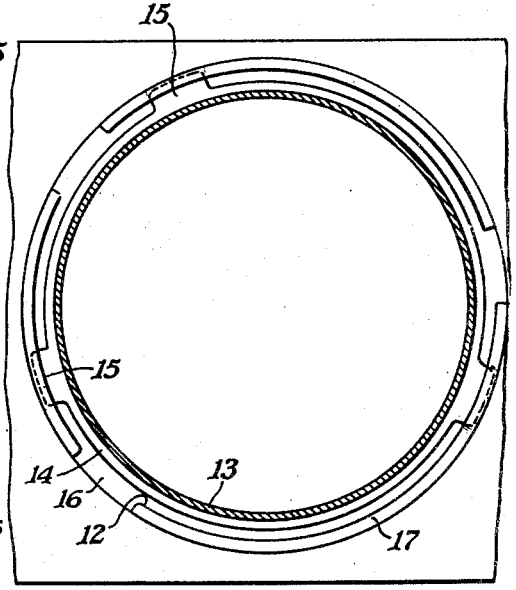
Fig. 2 is a transverse sectional view through the mount and lens tube shown in Fig. 1, and taken substantially on line 2—2 thereof, showing the relation of the interengaging keys and keyways, and with the lens tube in its locked relation.
Figure 3:
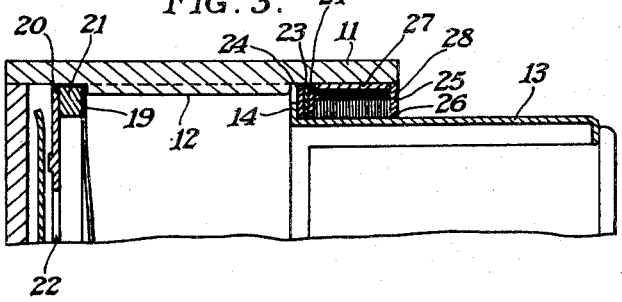
Fig. 3 is a partial view of the structure illustrated in Fig. 1, showing the lens tube in its extended or operative position.
Figure 5:
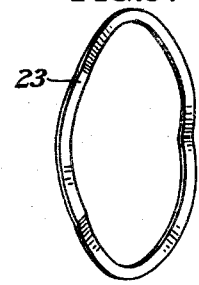
Fig. 5 is a perspective view of the annular front spring washer which limits the forward axial movement of the mount, and which moves the keys into the registering keyways upon proper positioning of the lens tube.
Figure 4:
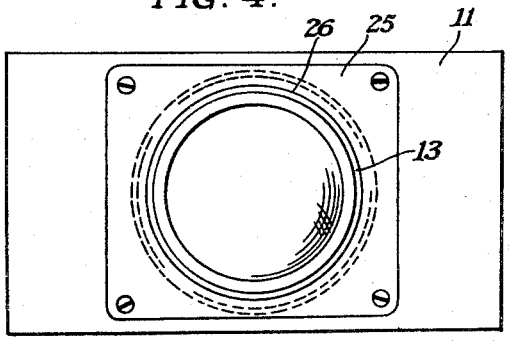
Fig. 4 is a front view of the mount showing the apertured front plate through which the lens tube projects, and which serves to retain the parts in assembled relation.

The present invention relates to a lens mount in which is positioned a cylindrical lens tube which may be slid axially of the mount from a retracted inoperative position, as shown in Fig. 1, to an extended operative position, as shown in Fig. 3. To secure this result, the lens mount is formed with a cylindrical bore 12 in which is slidably mounted a cylindrical lens tube 13 in which a shutter and lens system, not shown, are positioned. The rear end of the lens tube is turned up to form a flange 14 from which project a plurality of, in the present instance three, radially-extending lugs or keys 15 adapted to extend into and be guided by similarly arranged keyways 16 formed on a periphery 17 of the bore 12, as best shown in Fig. 2.

The rear of the keyways is closed by a flat spring washer 19 spaced from the film aperture plate 20 by a spacer 21. As the plate 20 is formed with a rectangular aperture 22, for well-known reasons, the spring 19 is in the form of a hollow rectangle as to lie just outside the aperture 22, for reasons apparent to those in the art. The keyways 16 terminate short of the front of the bore 12 and are closed by an annular flat spring washer 23 positioned between a pair of spacing rings 24, all of which is shown in Fig. 1. Thus the ends of the keyways are closed by spring washers, the purpose of which will be later pointed out.

The front of the bore 12 is closed by a plate 25 formed with a circular opening 26 through which the tube 13 may move. A spacing tube 27 is positioned between the plate 25 and the front spring 23 to retain the latter in place to close the front end of the keyways 16. In order to provide the necessary light lock, a packing, such for example, as a sized mohair strip 28, is laid in the space between the lens tube 13 and the spacing tube 27 to prevent light passing around the surface of the lens tube as the latter is slid in the bore 12, as clearly illustrated in Fig. 1.

The keys 15 and keyways 16 thus provide a spline connection which permits the lens tube to be slid from its retracted or inoperative position shown in Fig. 1 to its extended or operative position shown in Fig. 2, but without turning in the bore 12, as will be apparent. When the tube has been moved to either its operative or inoperative position, it is desirable to lock the tube against inadvertent or accidental movement.

Figure 6:
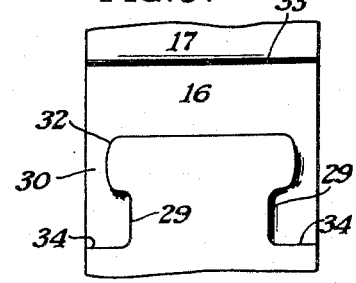
Fig. 6 is a partial view of the inner surface or periphery of the bored lens mount showing the adjusting and locking keyways, and the cam means therebetween.

To secure this result the periphery of the bore 12 is also provided with short keyways or recesses 29 positioned adjacent each end of the keyways 16 and arranged parallel thereto, as clearly shown in Fig. 6. These short keyways are connected to the large keyways 16 by means of peripherally-extending slots 30. It will be apparent that when the tube 30 is slid axially, the keys 15 will slide along the keyways 16 until the tube has been moved to one of said positions. Then by imparting a slight rotative movement, the keys are moved through the slots 30 and into registry with the short keyways 29. A slight axial movement will then serve to move the keys 15 into the keyways 29 to lock the tube in position. However, in order to insure retention of the keys 15 in the keyways 29, to lock the tube in either of its retracted or extended position, a wall of each slot 30 is formed with a cam 32, as clearly shown in Fig. 6, which is utilized to tension the springs 19 and 23, for a purpose to be presently described.

It will now be apparent, that when the tube is slid in either direction, the keys 15 will slide along the keyways 16 until the keys finally register with one of the slots 30, the particular slot depending of course on the direction of the movement. Now when the tube 13 is given a slight rotative movement, the keys will move through the slot 30 and engage the cams 32 positioned therein which will impart a slight additional axial movement to the tube to compress the spring 19 or 23, depending on the position of the tube. This compression of the spring serves to tension the latter so that when the keys are moved into position in registry with the short keyways 29, the tensioned spring will automatically move the keys axially and into position in the keyways 29 to lock the tube in adjusted position. Now when it is desired to again change the position of the tube, the latter is given a slight rotative movement in the opposite direction to again bring the keys 15 into contact with the cams 32 to tension the spring again so that when the tube has been rotated sufficiently to bring the keys into registry with the keyways 16, the tension spring will now move the keys automatically thereinto.

Thus, the cams 32 serve to tension the springs 19 and 23 to move the keys automatically into the keyways when brought into registration therewith. As the springs 19 and 23 close the ends of the keyways, they also afford axial stops for the keys 15 during the sliding movement of the lens tube. On the other hand, the edges or the shoulders 33 and 34 formed on keyways 16 and 29 respectively are positioned in the path of the keys 15 when the tube is rotated and thus act as rotative stops for the angular movement of the tube to position the keys 16 in registry with the proper keyway, as is apparent. Thus the springs 19 and 23 act as axial stops, while the edges or shoulders 33 and 34 act as rotative stops.

When the tube 13 is in the retracted position as shown in Fig. 1, and it is desired to move the tube to its forward or extended position, the tube is first given a slight rotative motion which moves the keys 15 through the rear slots 30 to bring the keys into contact with the rear cam 32 to compress the spring 19. This rotative movement is continued until the keys strike the rear shoulder or edge 33 of the keyway 16 at which time the keys 15 are in registry with the keyway 16, and move thereinto by reason of the compressed or tensioned spring 19. The tube 13 is then slid outwardly or axially, the keys 15 moving along the keyway 16, until the extended position is reached and the spring 23 limits further axial movement. The tube is then given a slight rotative movement which serves to move the keys 15 out of the keyway 16 and through the front slot 30 and into contact with the front cam 32 to compress spring 23. Further rotative movement finally brings the keys 15 into registry with the keyways 29 into which the keys 15 are moved automatically, by reason of the tension spring 23, to lock the tube in its extended or operative position. When the tube is to be moved to the retracted position as shown in Fig. 1, the above operation is reversed until the keys 15 are finally positioned in the rear keyway 29 and the tube locked in its retracted position.

Thus, the tube may be moved to either of its positions of adjustment and when so moved may be releasably locked; yet may be readily released so that the tube may be easily and quickly moved to the other position when desired. The spring washers serve not only to limit the axial movement of the tube to provide axial stops, but also serve to push or move the keys into one of the keyways when brought into registry therewith. The walls of the keyways, on the other hand, serve as rotative stops to insure registry of the keys with the proper keyway.

While one embodiment of the invention has been disclosed, it is to be understood that the inventive idea may be carried out in a number of ways. This application is, therefore, not to be limited to the precise details disclosed, but is intended to cover all variations and modifications thereof falling within the scope of the appended claims.

We claim:

1. In a camera, the combination with a lens mount formed with a cylindrical bore the periphery of which is provided with spaced axially extending keyways, of a cylindrical lens tube telescopically arranged in said bore and movable axially therein between a retracted inoperative position and an extended operative position, radially extending keys formed on said tube and extending into said keyways to guide said tube during axial movement, said periphery also being formed with short keyways spaced peripherally from said first keyways, said periphery further having peripheral slots connecting one end of said keyways, said tube in one of said positions being rotatable relative to said bore to position said keys selectively in registry with one of said groups of keyways, and means for moving said keys automatically into the registering keyways.

2. In a camera, the combination with a lens mount formed with a cylindrical bore the periphery of which is provided with spaced axially extending keyways, of a cylindrical lens tube telescopically arranged in said bore and movable axially therein between a retracted inoperative position and an extended operative position, radially extending keys formed on said tube and extending into said keyways to guide said tube during axial movement, said periphery also being formed with short keyways spaced peripherally from said first keyways, said periphery further having peripheral slots connecting opposite ends of said keyways, said tube in each of said positions being rotatable relative to said bore to position said keys selectively in registry with one of said groups of keyways, means for moving said keys into the registering keyways, and means carried by said mount for limiting the axial and rotative movement of said tube.

3. In a camera, the combination with a lens mount formed with a cylindrical bore the periphery of which is provided with spaced axially extending keyways, of a cylindrical lens tube telescopically arranged in said bore and movable axially therein between a retracted inoperative position and an extended operative position, radially extending keys formed on said tube and extending into said keyways to guide said tube during axial movement, said periphery also being formed with short keyways spaced peripherally from the ends of said first keyways, said periphery further having peripheral slots connecting the ends of said keyways, said tube in one of said positions being rotatable relative to said bore to position said keys selectively in registry with one of said groups of keyways, means both for limiting the axial movement of said tube and for moving said keys into the registering keyways, and means on said bore positioned in the path of said keys for limiting the rotative movement of said tube to position said keys selectively in registry with one of said groups of keyways.

4. In a camera, the combination with a lens mount formed with a cylindrical bore the periphery of which is provided with spaced axially extending keyways, of a cylindrical lens tube telescopically arranged in said bore and movable axially therein between a retracted inoperative position and an extended operative position, radially extending keys formed on said tube and extending into said keyways to guide said tube during axial movement, said periphery also being formed with short keyways spaced peripherally from the ends of said first keyways, said periphery further having peripheral slots connecting the adjacent ends of said keyways, said tube in either of said positions being rotatable relative to said bore to position said keys selectively in registry with one of said groups of keyways, a spring positioned in said bore adjacent an end of said keyways to limit the axial movement of said tube and to shift the latter axially to position said keys in the registering keyways, and shoulders formed on said keyways adapted to be engaged by said keys to limit the rotative movement of said tube to position said keys in registry with one of said group of keyways.

5. In a camera, the combination with a lens mount formed with a cylindrical bore the periphery of which is provided with spaced axially extending keyways, of a cylindrical lens tube telescopically arranged in said bore and movable axially therein between a retracted inoperative position and an extended operative position, radially extending keys formed on said tube and extending into said keyways to guide said tube during axial movement, said periphery also being formed with short keyways spaced peripherally from the ends of said first keyways, said periphery further having peripheral slots connecting adjacent ends of said keyways, said tube in said positions being rotatable relative to said bore to position said keys selectively in registry with one of said groups of keyways, a compressible annular spring washer positioned in said bore to limit the axial movement of said tube and to shift said keys into the registering keyways, and shoulder means formed on said periphery to limit the rotative movement of said tube to position said keys in registry with one of said group of keyways.

6. In a camera, the combination with a lens mount formed with a cylindrical bore the periphery of which is provided with spaced axially extending keyways, of a cylindrical lens tube telescopically arranged in said bore and movable axially therein between a retracted inoperative position and an extended operative position, radially extending keys formed on said tube and extending into said keyways to guide said tube during axial movement, said periphery also being formed with short keyways spaced peripherally from the ends of said first keyways, said periphery further having peripheral slots connecting adjacent ends of said keyways, said tube in said positions being rotatable relative to said bore to position said keys selectively in registry with one of said groups of keyways, a compressible annular spring washer positioned in said bore to limit the axial movement of said tube and to shift said keys into the registering keyways, means on said mount adapted to be engaged by said keys to compress said spring when said tube is rotated, and stop means on said periphery for limiting the rotative movement of said tube to position said keys in registry with one of said groups of keyways.

7. In a camera, the combination with a lens mount formed with a cylindrical bore the periphery of which is provided with spaced axially extending keyways, of a cylindrical lens tube telescopically arranged in said bore and movable axially therein between a retracted inoperative position and an extended operative position, radially extending keys formed on said tube and extending into said keyways to guide said tube during axial movement, said periphery also being formed with short keyways spaced peripherally from the ends of said first keyways, said periphery further having peripheral slots connecting adjacent ends of said keyways, said tube in one of said positions being rotatable relative to said bore to position said keys selectively in registry with one of said groups of keyways, a compressible spring washer positioned in said bore to close an end of said first keyways and to limit the axial movement of said tube, cam means formed on said periphery intermediate said groups of keyways and engageable by said keys as the latter are moved between said groups of keyways to impart a slight axial movement to said tube to tension said washer so that when said keys register with one of said group of keyways the tensioned washer will move the keys thereinto, and shoulder means associated with said keyways to limit the rotative movement of said tube to position said keys in registry with one of said groups.

8. In a camera, the combination with a lens mount formed with a cylindrical bore the periphery of which is formed with a group of peripherally spaced axially extending open-end keyways, of a cylindrical lens tube telescopically arranged in said bore and movable axially therein between a retracted inoperative position and an extended operative position, apertured plates carried by said mount for closing the ends of said bore, radially extending keys formed on said tube and extending into said keyways to guide said tube during axial movement, apertured spring washers positioned at the ends of said keyways to close the latter and to limit the axial movement of said tube, said periphery having a second group of short locking keyways positioned adjacent the ends of said first keyways and connected thereto by peripherally extending slots, said tube being rotatable in either of said positions to move said keys selectively through said slots and into registry with either of said groups of keyways, cam means formed on said periphery between said groups and engageable by said keys moving through said slots to impart a slight axial movement to said tube to tension the adjacent washer so that the tensioned washer will serve to move said keys into one of said groups of keyways when positioned in registry therewith, said second group of keyways serving to lock said tube selectively in said positions when said keys are positioned therein, and means associated with said keyways for limiting the rotative movement of said tube to position said keys in registry with one of said groups of keyways.

JOHN L. QUIGLEY.
DOUGLASS C. HARVEY.

REFERENCES CITED

The following references are of record in the file of this patent:

UNITED STATES PATENTS

| Number | Name | Date |
| --- | --- | --- |
| 1,175,609 | Cottrell | Mar. 14, 1916 |
| 2,011,359 | Gaty | Aug. 13, 1935 |
| 2,126,300 | Wittel | Aug. 9, 1938 |
| 2,150,106 | Roessel | Mar. 7, 1939 |
| 2,208,797 | Kende | July 23, 1940 |
| 2,383,439 | Baer | Aug. 28, 1945 |